US010160124B2

(12) United States Patent
Wong

(10) Patent No.: US 10,160,124 B2
(45) Date of Patent: Dec. 25, 2018

(54) SCISSORS

(71) Applicant: KAI R&D CENTER CO., LTD., Seki-shi (JP)

(72) Inventor: Hung Tai Wong, Seki-Shi (JP)

(73) Assignee: KAI R&D CENTER CO., LTD., Seki-Shi (JP)

( * ) Notice: Subject to any disclaimer, the term of this patent is extended or adjusted under 35 U.S.C. 154(b) by 399 days.

(21) Appl. No.: 14/914,024

(22) PCT Filed: Aug. 25, 2014

(86) PCT No.: PCT/JP2014/072151
§ 371 (c)(1),
(2) Date: Feb. 24, 2016

(87) PCT Pub. No.: WO2015/029943
PCT Pub. Date: Mar. 5, 2015

(65) Prior Publication Data

US 2016/0221199 A1 Aug. 4, 2016

(30) Foreign Application Priority Data

Aug. 27, 2013 (JP) ................................ 2013-175699

(51) Int. Cl.
*B26B 13/16* (2006.01)
*B26B 13/04* (2006.01)
(Continued)

(52) U.S. Cl.
CPC .............. *B26B 13/16* (2013.01); *B26B 13/04* (2013.01); *B26B 13/06* (2013.01); *B26B 13/12* (2013.01)

(58) Field of Classification Search
CPC ......... B26B 13/16; B26B 13/04; B26B 13/06; B26B 13/12; B26B 13/00
(Continued)

(56) References Cited

U.S. PATENT DOCUMENTS 2,392,118 A * 1/1946 Cacarillo .................. B25B 7/08 139/417
5,697,159 A 12/1997 Linden et al.
(Continued)

FOREIGN PATENT DOCUMENTS

JP S54141583 U1 11/1979
JP 58152583 A 9/1983
(Continued)

OTHER PUBLICATIONS

Office Action dated Jul. 4, 2017, during the prosecution of the corresponding Japanese patent application.
(Continued)

*Primary Examiner* — Phong Nguyen
(74) *Attorney, Agent, or Firm* — Cantor Colburn LLP

(57) ABSTRACT

Scissors include first and second body portions, and a pivot support portion that supports the first and second body portions. The scissors further include a movable transmission member attached to a handle of the first body portion, a spring provided between the handle of the first body portion and the movable transmission member, and rows of teeth configured to transmit urging force from the spring to the second body portion through the movable transmission member. The pivot support portion has a pivot and a pivot hole that enables the first and second body portions to be assembled and disassembled. The rows of teeth are provided on the movable transmission member and a handle of the second body portion, and can be attached to or detached from each other when assembling and disassembling the first and second body portions.

9 Claims, 6 Drawing Sheets

(51) Int. Cl.
*B26B 13/06* (2006.01)
*B26B 13/12* (2006.01)

(58) Field of Classification Search
USPC ......... 30/260, 194, 186, 191–193, 244, 250, 30/252–254
See application file for complete search history.

(56) References Cited

U.S. PATENT DOCUMENTS

| | | | | |
|---|---|---|---|---|
| 6,223,621 | B1 * | 5/2001 | Wesling | B62K 23/06 74/491 |
| 2005/0011321 | A1 * | 1/2005 | Hsien | B25B 7/08 81/417 |
| 2007/0144014 | A1 * | 6/2007 | Toyama | A01G 3/02 30/254 |
| 2007/0144015 | A1 | 6/2007 | Peterson | |
| 2007/0209213 | A1 * | 9/2007 | Chorpash | B26B 11/005 30/231 |
| 2010/0011970 | A1 * | 1/2010 | Asher | A23G 1/505 99/323.3 |
| 2012/0137840 | A1 | 6/2012 | Chen et al. | |
| 2013/0091713 | A1 * | 4/2013 | Wu | A01G 3/02 30/254 |

FOREIGN PATENT DOCUMENTS

| | | | |
|---|---|---|---|
| JP | 59109417 | U | 7/1984 |
| JP | S60130313 | A | 7/1985 |
| JP | 01308583 | A | 12/1989 |
| JP | 02148665 | U | 12/1990 |
| JP | 09173659 | A | 7/1997 |
| JP | H09313752 | A | 12/1997 |
| JP | 2000262776 | A | 9/2000 |
| JP | 2005052246 | A | 3/2005 |

OTHER PUBLICATIONS

International Search Report dated Nov. 11, 2014.

International Preliminary Search Report on Patentability; International Application No. PCT/JP2014/072151; International Filing Date Aug. 25, 2014; dated Mar. 1, 2016, 6 pages.

* cited by examiner

SCISSORS

BACKGROUND OF THE INVENTION

The present invention relates to scissors including a pair of body portions, each of which has a handle and a blade, and a pivot support portion for supporting the body portions in an openable and closable manner.

Patent Document 1 discloses a pair of scissors in which a spring for urging a pair of blades in such a direction that the blades close with respect to each other is provided between a pair of handles. The spring assists in operations for opening and closing the body portions.

PRIOR ART DOCUMENTS

Patent Documents

Patent Document 1: Japanese Laid-Open Utility Model Publication No. 59-109417

SUMMARY OF THE INVENTION

In the scissors of Patent Document 1, when the second handle is selectively opened and closed with respect to the first handle, the spring may deform greatly and cause the user to touch the spring. In this case, the spring may interfere with the handles, thus hampering smooth opening or closing of the handles. Easy handling of the scissors by the user is thus hampered. Further, in a case in which the two body portions are coupled to each other in a manner enabling assembly and disassembly of the body portions to facilitate maintenance work such as washing the body portions, the spring must be easily attached to and detached from the body portions. However, in the scissors disclosed in Patent Document 1, the spring is suspended in a state fixed at the position between the two handles and thus hampers easy assembly and disassembly of the body portions.

Accordingly, it is an objective of the present invention to enable smooth opening and closing of a pair of body portions by decreasing influence on an urging member by operation of the body portions when the body portions are opened or closed. It is another objective of the invention to provide a pair of scissors having an easily attachable and detachable second body portion with respect to a first body portion in a case in which an urging member is arranged between a pair of body portions to assist in opening and closing of the body portions and the body portions are coupled to each other in a manner enabling assembly and disassembly of the body portions.

To achieve the foregoing objective and in accordance with one aspect of the present invention, scissors are provided that include a first body portion and a second body portion each having a handle and a blade, a pivot support portion that supports the first and second body portions in an openable and closable manner, a movable transmission member attached to the first body portion, an urging member arranged between the first body portion and the movable transmission member, and an interlocking mechanism adapted to transmit urging force produced by the urging member to the second body portion through the movable transmission member.

In this configuration, the movable transmission member and the urging member are arranged in the first body portion. This decreases influence on the urging member by operation of the second body portion when the second body portion is opened or closed with respect to the first body portion. The first and second body portions are thus smoothly opened or closed. Also, since the urging member operates independently from the second body portion, the second body portion is easily attached to and detached from the first body portion in a case in which the two body portions are coupled together in a manner enabling assembly and disassembly of the body portions.

The movable transmission member is preferably attached to the handle of the first body portion, and the urging member is preferably arranged between the movable transmission member and the handle of the first body portion. The pivot support portion preferably has a coupling portion that enables assembly and disassembly of the first and second body portions. Also, the interlocking mechanism preferably has a first interlocking portion and a second interlocking portion arranged in the movable transmission member and the handle of the second body portion, respectively, and the first and second interlocking portions are preferably attachable to and detachable from each other when the first and second body portions are assembled and disassembled. In this case, since the movable transmission member and the urging member are arranged in the handle of the first body portion, the urging member is operated independently from the second body portion. This enables easy attachment and detachment of the second body portion with respect to the first body portion.

The handle of the first body portion preferably has a grip portion, and the movable transmission member is preferably provided between the grip portion and the pivot support portion. In this case, since the movable transmission member is arranged between the grip portion and the pivot support portion, the grip portion of the handle is gripped with no hindrance.

The movable transmission member is preferably pivotally supported by the handle of the first body portion. In this case, the urging force of the urging member is smoothly transmitted to the second body portion by pivoting the movable transmission member.

The first interlocking portion and the second interlocking portion are preferably rows of teeth that are meshed with each other in a manner attachable to and detachable from each other. In this case, the urging force of the urging member is smoothly transmitted between the movable transmission member and the handle of the second body portion in an interlocking manner.

An accommodating portion is preferably arranged between the movable transmission member and the handle of the first body portion, and the urging member is preferably received in the accommodating portion. This case allows compact arrangement of the urging member in the first body portion.

The handle of the first body portion preferably includes a recess serving as the accommodating portion, and the movable transmission member and the urging member are preferably arranged inside an opening of the recess. In this case, by accommodating the movable transmission member and the urging member in the recess, compact arrangement of the movable transmission member and the urging member in the first body portion is allowed.

In accordance with another aspect of the present invention, scissors are provided that include a first body portion and a second body portion each having a handle and a blade, a pivot support portion that supports the first and second body portions in an openable and closable manner, a coupling portion arranged in the pivot support portion to enable assembly and disassembly of the first and second body portions, and an urging member arranged between the first and second body portions to urge the blades and the handles each in an opening direction. The urging member is selectively attachable to and detachable from either one of the first and second body portions when the first and second body portions are assembled or disassembled.

In this configuration, the urging member is attachable to and detachable from at least either one of the first and second body portions. As a result, when the first and second body portions are assembled or disassembled, the second body portion is easily attached to or detached from the first body portion.

A pivot axis of the movable transmission member is preferably set at a position spaced from a pivot axis of the pivot support portion of the first and second body portions. In this case, when the first and second body portions are opened or closed, operation of the pivot support portion about the pivot axis and pivoting action of the movable transmission member about the pivot axis are allowed to happen smoothly in an interlocking manner.

When the first and second body portions are open at a predetermined angle, the coupling portion of the pivot support portion is preferably capable of attaching and detaching the first and second body portions along a pivot axis of the pivot support portion of the first and second body portions. In this case, assembly and disassembly of the first and second body portions are enabled when the first and second body portions are open by a predetermined angle. As a result, the first and second body portions are smoothly opened or closed as long as the body portions are held in a state other than the open state by the predetermined angle.

The coupling portion is preferably configured by a pivot arranged in one of the first and second body portions and a pivot hole formed in the other one of the first and second body portions, and the pivot can preferably be inserted into and detached from the pivot hole when the first and second body portions are assembled and disassembled. In this case, the coupling portion, which is configured by the pivot and the pivot hole, enables easy insertion and detachment of the first and second body portions about the pivot axis of the pivot support portion.

Each of the handles is preferably arranged on a proximal side of the pivot support portion in the associated one of the body portions, and each of the blades is preferably arranged on a distal side of the pivot support portion in the associated one of the body portions.

A lock lever is preferably attached to one of the handle of the first body portion and the handle of the second body portion, and a lock recess with which the lock lever is engaged is preferably provided in the other one of the handle of the first body portion and the handle of the second body portion. Also, the lock lever and the lock recess are preferably switchable between an unlocked state, in which the lock lever is detached from the lock recess, and a locked state, in which the lock lever is engaged with the lock recess. In the unlocked state, the urging force of the urging member preferably opens the handle of the second body portion with respect to the handle of the first body portion. In the locked state, the handle of the second body portion is preferably prevented from being opened with respect to the handle of the first body portion against the urging force of the urging member. Further, cam surfaces are preferably formed on the lock lever and the lock recess such that, when, in the locked state, the handle of the second body portion is pivoted in a closing direction with respect to the handle of the first body portion against the urging force of the urging member, the lock lever is detached from the lock recess to switch to the unlocked state. In this case, in a pair of western scissors having first and second body portions crossing each other in an X shape, the first and second body portions are easily unlocked from each other.

The scissors according to the present invention include the first and second body portions, each of which has a handle and a blade, and a pivot support portion for supporting the first and second body portions in an openable and closable manner. Also, an urging member is arranged between the first and second body portions to assist in operations for opening and closing the first and second body portions. The scissors according to the invention decrease influence on the urging member by operation of the first and second body portions when the body portions are opened or closed. This enables smooth opening and closing of the first and second body portions, thus facilitating handling of the scissors by the user. Further, in a case in which the first and second body portions are coupled to each other in a manner enabling assembly and disassembly of the first and second body portions, the second body portion is easily attached to and detached from the first body portion.

DETAILED DESCRIPTION OF THE PREFERRED EMODIMENTS

A pair of scissors 100 according to one embodiment will now be described with reference to the drawings. The scissors 100 are used to cut chicken meat and bones.

Figure 1:
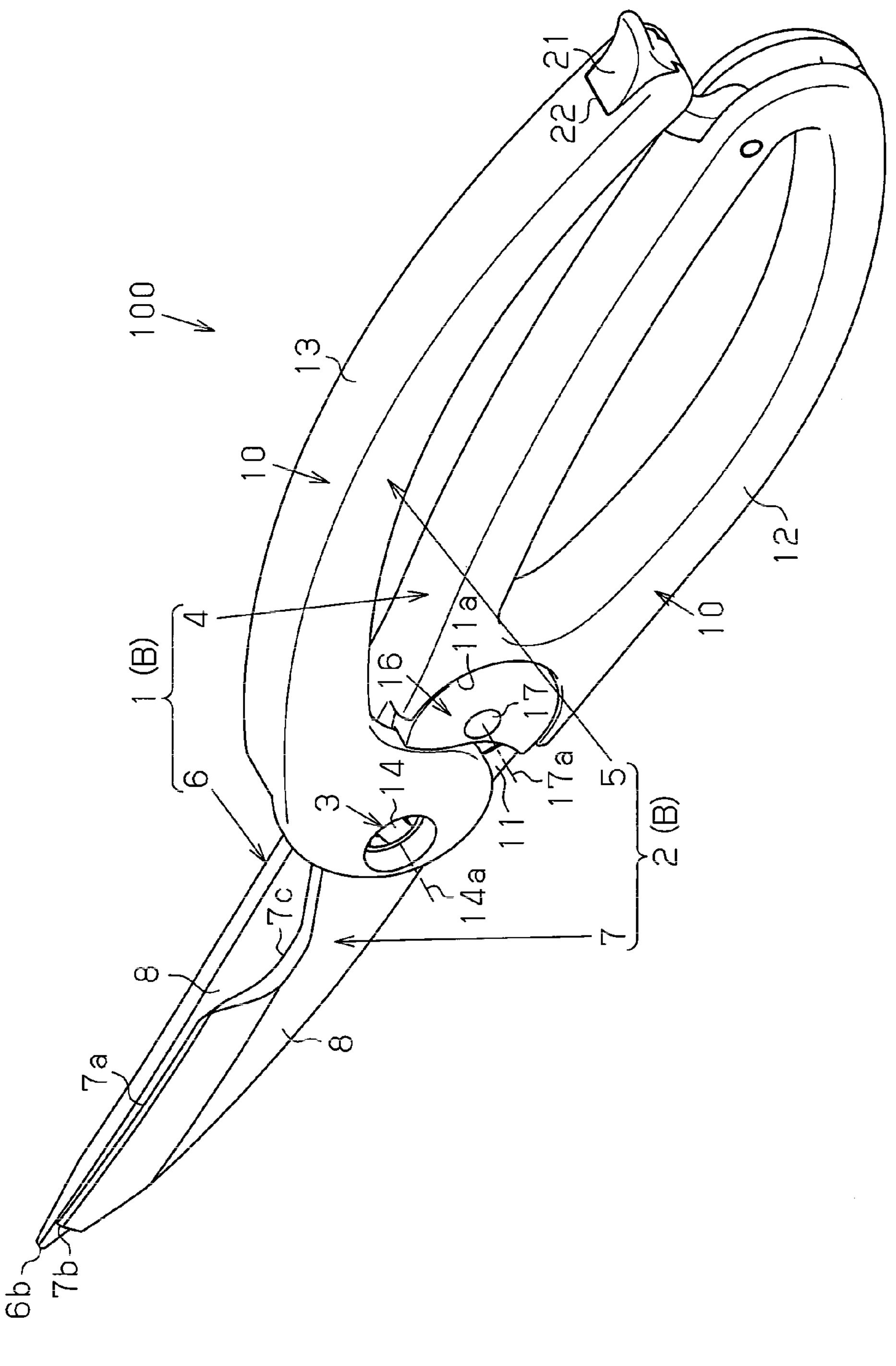
FIG. 1 is a perspective view showing a pair of scissors in an assembled and closed state.
Figures 2A, 2B:
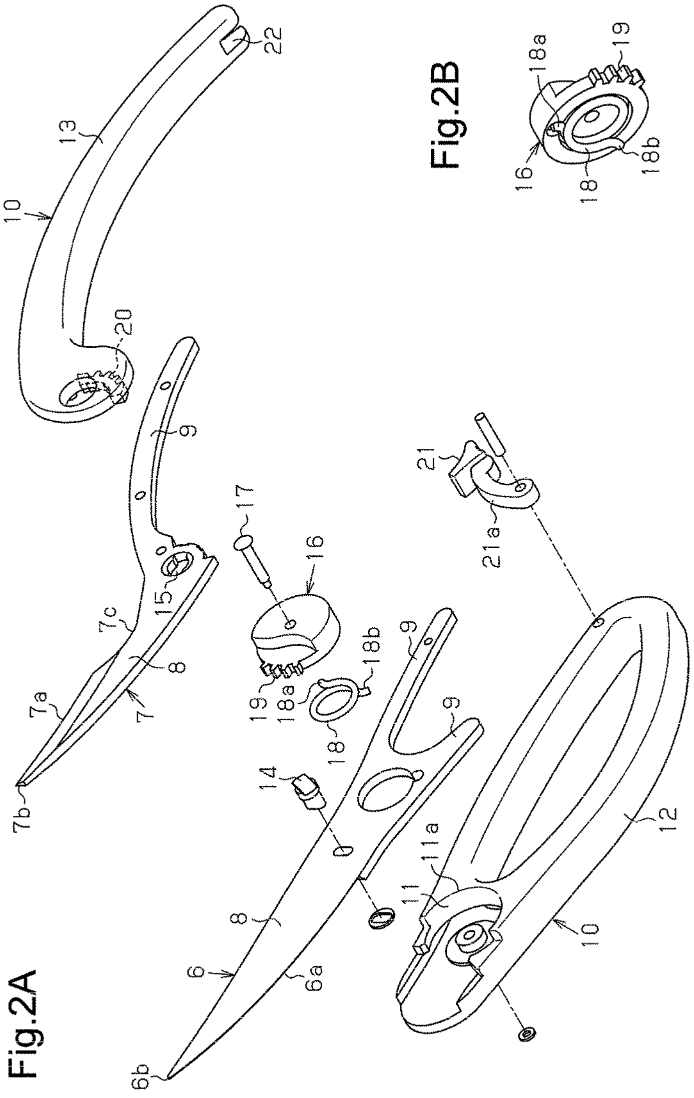
FIG. 2A is a perspective view showing the scissors in a disassembled state.
FIG. 2B is a partial perspective view showing a movable transmission member to which a torsion coil spring is attached.

As shown in FIGS. 1 and 2, a first body portion 1 and a second body portion 2 are supported by a pivot support portion 3 in an openable and closable manner. The body portions 1 and 2 respectively have a handle 4 and a handle 5, which are arranged on the proximal side of the pivot support portion 3. The body portions 1 and 2 respectively have a blade 6 and a blade 7, which are located on the distal side of the pivot support portion 3. Each of the blades 6, 7 has a cutting edge 6*a*, 7*a* and a point 6*b*, 7*b*. The blade 7 of the second body portion 2 has a concave blade 7*c*, which extends continuously from the cutting edge 7*a* in the vicinity of the pivot support portion 3. Each blade 6, 7 has a roughened surface. When the first and second body portions 1, 2 are closed, the points 6*b*, 7*b* of the blades 6, 7 are located offset from each other in a forward-rearward direction.

The blades 6, 7 of the first and second body portions 1, 2 are each configured by a metallic blade plate 8. A plastic cover portion 10 is arranged on a metallic support plate 9 extending from each of the blade plates 8. The handle 4, 5 of each of the first and second body portions 1, 2 is configured by a support plate 9 and a cover portion 10. Each of the cover portions 10 is formed integrally with the support plates 9 by inserting the support plate 9 into a metal mold and then injecting plastic into the mold. Of the two handles 4, 5, the cover portion 10 of the first handle 4 has a grip ring 12 (a grip portion). The grip portion 12 has an annular shape and a recess 11 adjacent to the pivot support portion 3. The cover portion 10 of the second handle 5 has a grip portion 13, which extends linearly from the pivot support portion 3.

Figure 3:
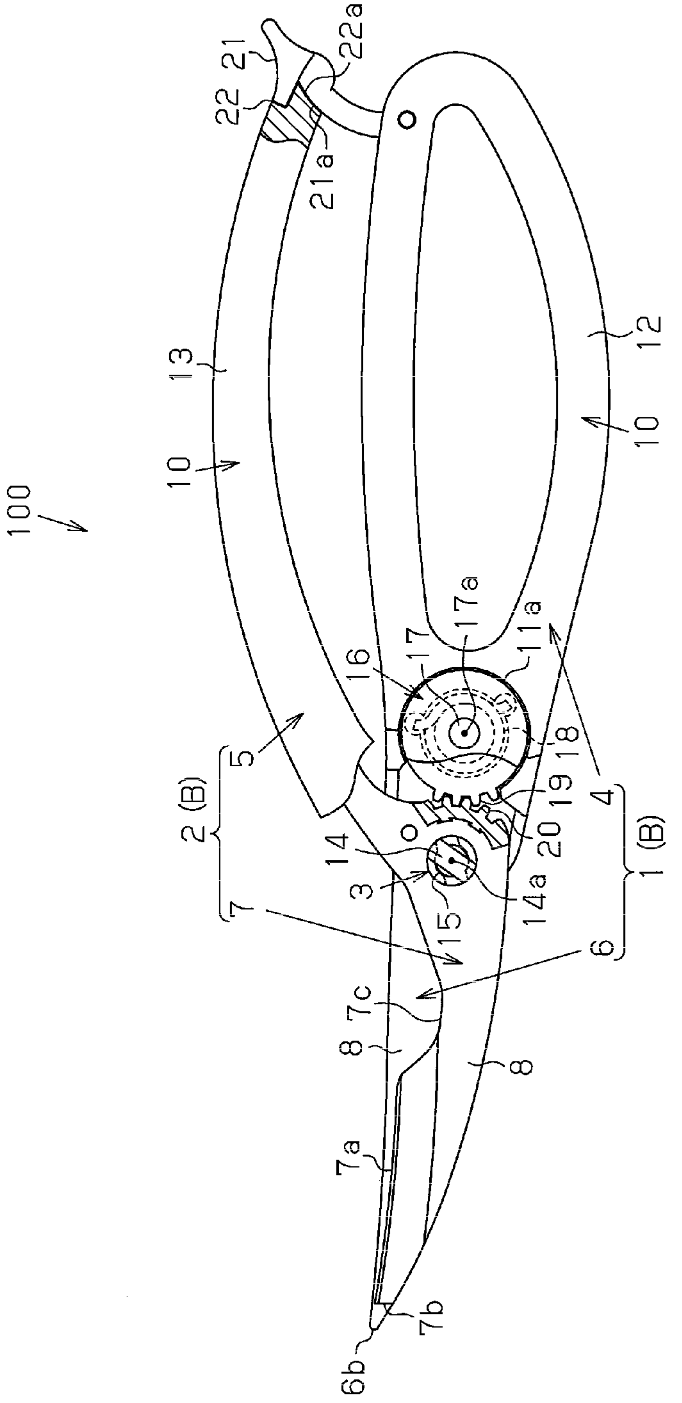
FIG. 3 is a partially cutaway front view showing the scissors in a closed state.
Figure 4:
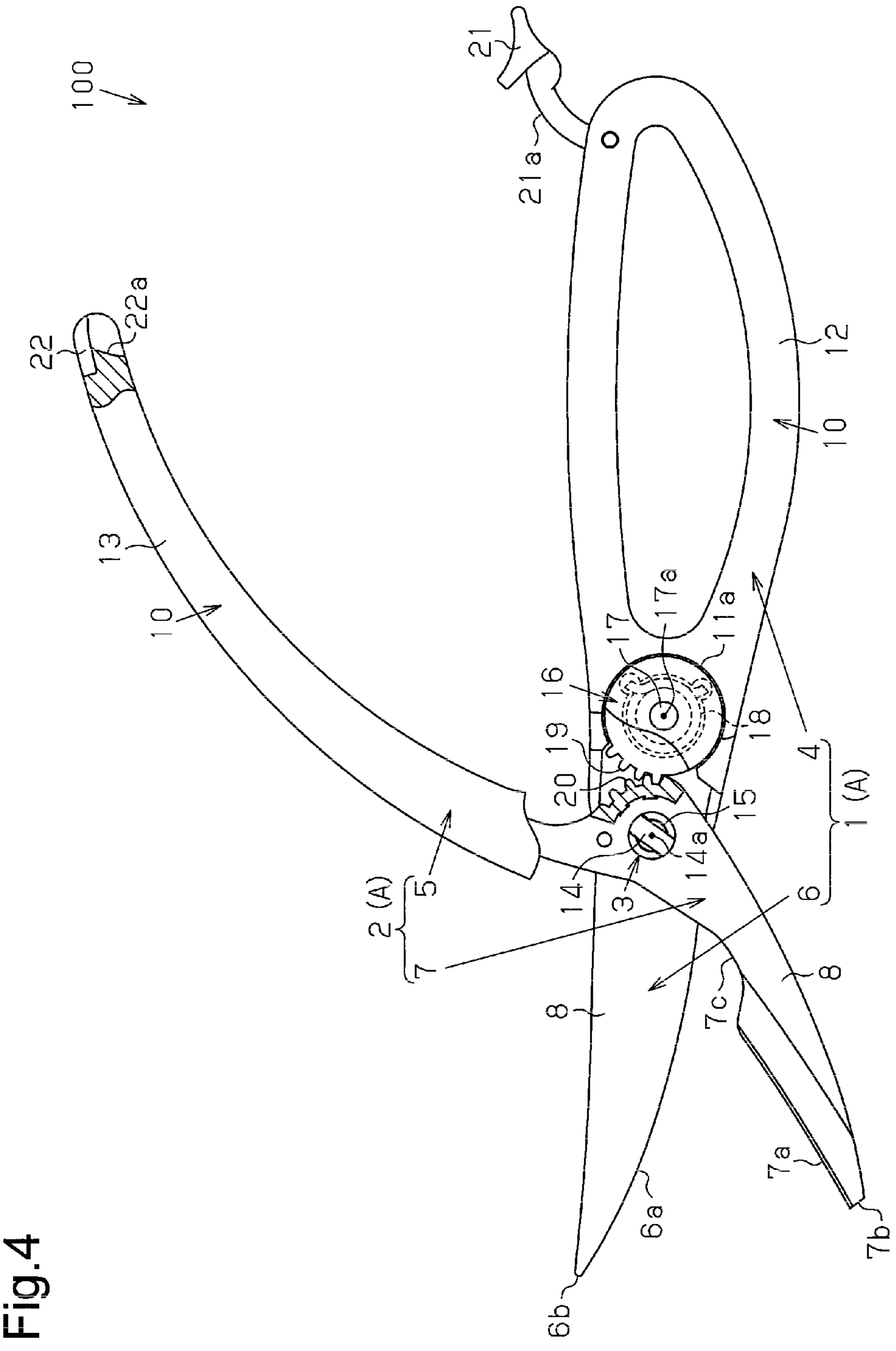
FIG. 4 is a partially cutaway front view showing the scissors in an open state.

The pivot support portion 3 has a pivot 14 and a pivot hole 15. Of the first and second body portions 1, 2, the pivot 14 is in the first body portion 1 at the boundary between the blade plate 8 and the support plate 9. The pivot hole 15 is formed in the boundary between the blade plate 8 and the support plate 9 of the second body portion 2. The pivot 14 and the pivot hole 15 constitute a coupling portion. When the pivot 14 is inserted into the pivot hole 15, the first and second body portions 1, 2 can be pivoted about a pivot axis 14*a* of the pivot 14 and thus opened or closed as illustrated in FIGS. 3 and 4. In normal use, the pivot 14 is hooked to the pivot hole 15 and thus restrains disassembly of the first and second body portions 1, 2 at the pivot support portion 3 when the first and second body portions 1, 2 are opened or closed. However, with reference to FIG. 5, the first and second body portions 1, 2 can be disassembled from each other by opening the first and second body portions 1, 2 by a predetermined maximum open angle θ of the first and second body portions 1, 2, at which the shapes of the pivot 14 and the pivot hole 15 are aligned with each other. The angle θ is set to approximately 50 degrees.

The recess 11 (an accommodating portion) is provided between the pivot support portion 3 and the grip ring 12 in the cover portion 10 of the first handle 4. A pivot axis 17*a* of a support pivot 17, which is parallel to and spaced from the pivot axis 14*a* of the pivot support portion 3 by a predetermined distance, is set in the recess 11. A movable transmission member 16, which is made of plastic, is supported pivotally about the pivot axis 17*a* of the support pivot 17. A torsion coil spring 18 serving as an urging member is received in the recess 11 on the inner side of the movable transmission member 16. The torsion coil spring 18 has a pair of arms 18*a*, 18*b*, one arm 18*a* of which is engaged with the movable transmission member 16. The other arm 18*b* is engaged with the corresponding support plate 9 in the recess 11. In this manner, the urging force of the torsion coil spring 18 is applied to the movable transmission member 16. The movable transmission member 16 and the torsion coil spring 18 are located inside an opening end 11*a* of the recess 11.

A plastic row of teeth 19 (an interlocking portion) is provided on an outer periphery of the movable transmission member 16 in an arcuate shape about the pivot axis 17*a* of the support pivot 17. A plastic row of teeth 20 (an interlocking portion) is provided on the cover portion 10 of the second handle 5 in an arcuate shape about the pivot axis 14*a* of the pivot support portion 3. The rows of teeth 19, 20 are meshed with each other. The urging force of the torsion coil spring 18 is transmitted to the rows of teeth 19, 20 through the movable transmission member 16 and acts to open the blades 6, 7 and the handles 4, 5 of the first and second body portions 1, 2.

With reference to FIGS. 3 and 4, a lock lever 21 is pivotally supported by an end section of the cover portion 10 of the handle 4 of the first body portion 1. A lock recess 22 is provided in an end section of the cover portion 10 of the handle 5 of the second body portion 2. The lock lever 21 is engageable with the lock recess 22. With reference to FIG. 4, in an unlocked state A, in which the lock lever 21 is detached from the lock recess 22, the urging force of the torsion coil spring 18 opens the handle 5 of the second body portion 2 with respect to the handle 4 of the first body portion 1. As shown in FIG. 3, in a locked state B, in which the lock lever 21 is engaged with the lock recess 22, the handle 5 of the second body portion 2 is prevented from opening with respect to the handle 4 of the first body portion 1 against the urging force of the torsion coil spring 18. Cam surfaces 21*a* and 22*a* are formed in the lock lever 21 and the lock recess 22, respectively, such that, when the handle 5 of the second body portion 2 is slightly pivoted in a direction closing with respect to the handle 4 of the first body portion 1 against the urging force of the torsion coil spring 18 in the locked state B, the lock lever 21 becomes detached from the lock recess 22 to switch to the unlocked state A.

Opening and closing of the scissors 100 and assembly and disassembly of the first and second body portions 1, 2 will hereafter be described.

In FIG. 4, the scissors 100 are in the locked state A, in which the urging force of the torsion coil spring 18 opens the handle 5 of the second body portion 2 with respect to the handle 4 of the first body portion 1. If the first and second body portions 1, 2 are pivoted about the pivot axis 14*a* of the pivot support portion 3 to close the handles 4, 5 of the first and second body portions 1, 2, the movable transmission member 16 is pivoted about the pivot axis 17*a* through the rows of teeth 19, 20 of the handles 4, 5 to accumulate pressure on the torsion coil spring 18. If the force for closing the handles 4, 5 is decreased, the urging force of the torsion coil spring 18 pivots the movable transmission member 16 about the pivot axis 17*a*. This pivots the handles 4, 5 about the pivot axis 14*a* of the pivot support portion 3 through the rows of teeth 19, 20, thus opening the handles 4, 5. When the handles 4, 5 are opened or closed in this manner, the torsion coil spring 18 assists the handles 4, 5 to open with respect to each other.

Figure 5:
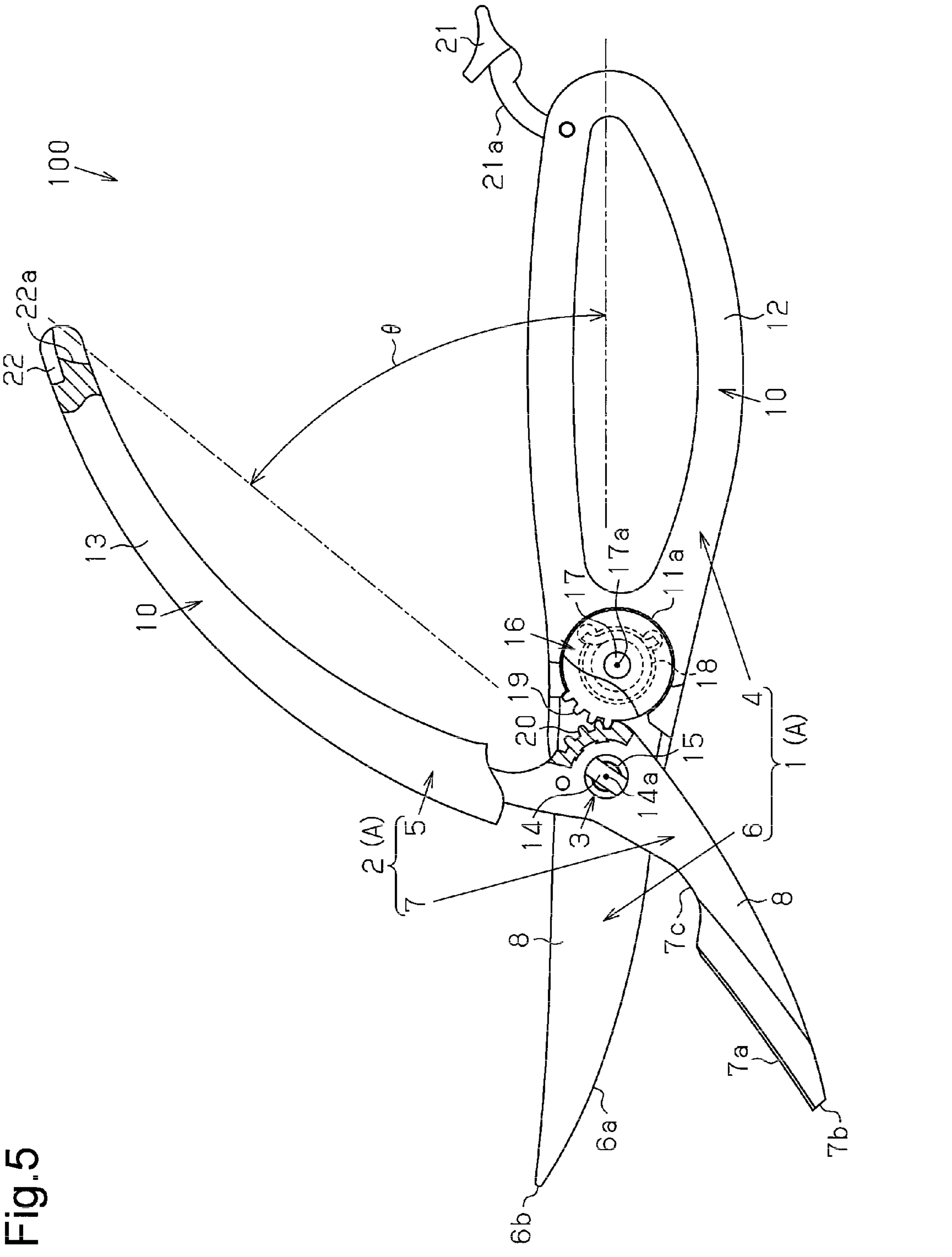
FIG. 5 is a partially cutaway front view showing the scissors in a state in which the scissors are open to such a position that the first and second body portions of the scissors can be disassembled from each other.
Figure 6:
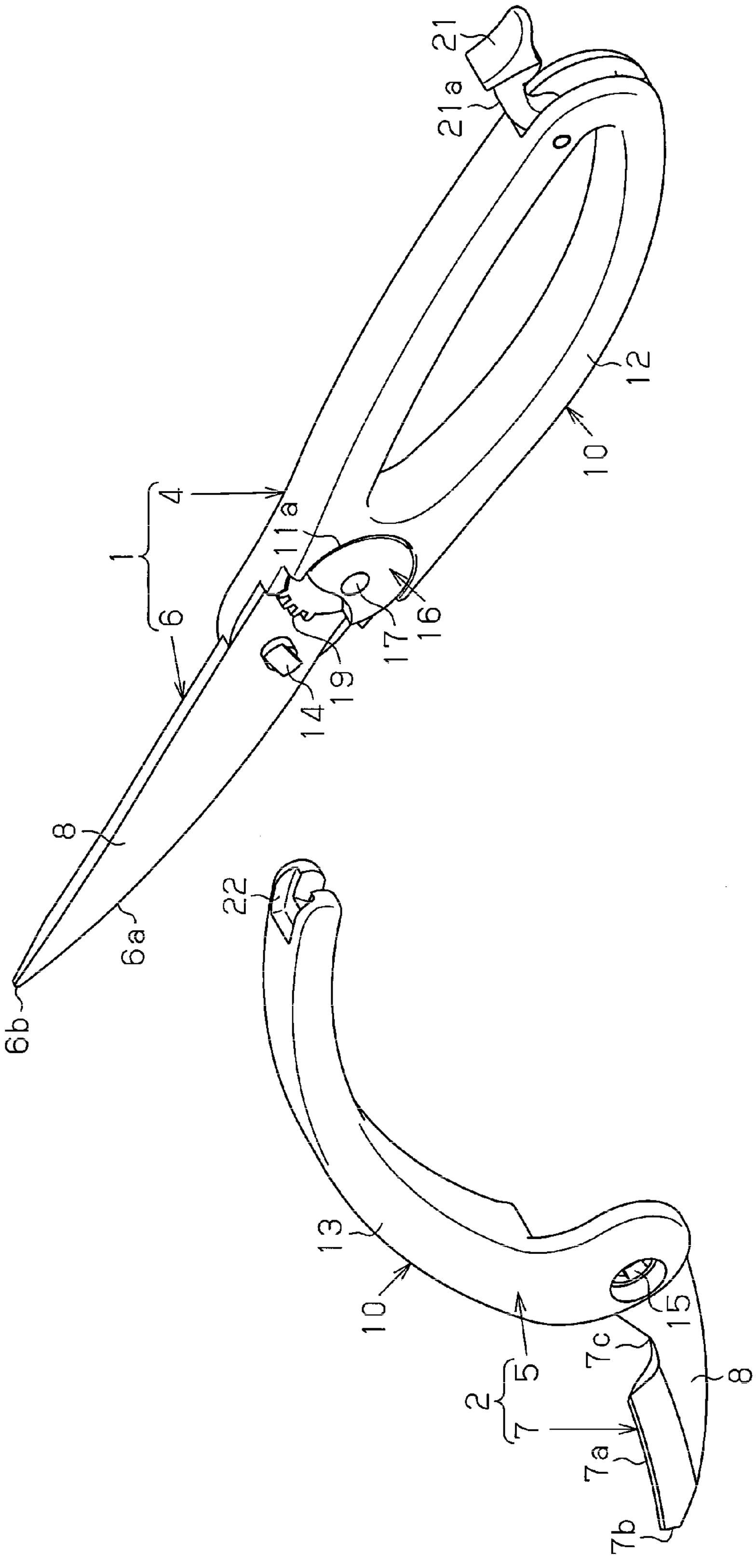
FIG. 6 is a perspective view showing the first body portion and the second body portion of the scissors in a disassembled state.

As illustrated in FIG. 5, when the first and second body portions 1, 2 are open to such an extent that the rectangular shape of the head portion of the pivot 14 is aligned with the rectangular shape of the recess of the pivot hole 15 in the pivot support portion 3, the first and second body portions 1, 2 are maximally open, and the angle θ in this state is approximately 50 degrees. In this state, by removing the pivot 14 from the pivot hole 15 as shown in FIG. 6, the first and second body portions 1, 2 are disassembled. Specifically, to disassemble the handles 4, 5 of the first and second body portions 1, 2, the row of teeth 19 of the movable transmission member 16, which is supported by the first handle 4, is detached from the row of teeth 20 of the second handle 5. In contrast, to assemble the first and second body portions 1, 2, the shape of the head portion of the pivot 14 is aligned with the shape of the recess of the pivot hole 15, the pivot 14 is inserted into the pivot hole 15 in the pivot support portion 3, and the rows of teeth 19, 20 are meshed with each other. In this state, the first and second body portions 1, 2 are openable and closable in an angular range smaller than the angle θ. The urging force of the torsion coil spring 18 is applied to the first and second body portions 1, 2 as long as the angle is maintained in a range to an angle slightly smaller than the angle θ (which is approximately 50 degrees).

The present embodiment achieves the following advantages.

(1) The scissors 100 include the handles 4, 5, which are arranged in the associated body portions 1, 2 on the proximal side of the pivot support portion 3, and the blades 6, 7, which are arranged in the associated first and second body portions 1, 2 on the distal side of the pivot support portion 3. The scissors 100 are in a form of a pair of western scissors with the first and second body portions 1, 2 crossing each other in an X shape. The handle 4 of the first body portion 1 has the movable transmission member 16 and the torsion coil spring 18. Thus, when the second body portion 2 is opened or closed with respect to the first body portion 1, influence on the torsion coil spring 18 by operation of the second body portion 2 is reduced. This limits the interference of the torsion coil spring 18 and allows smooth opening and closing of the first and second body portions 1, 2, thus facilitating handling of the scissors 100 by the user.

(2) Since the movable transmission member 16 and the torsion coil spring 18 are arranged in the handle 4 of the first body portion 1, the torsion coil spring 18 operates independently from the handle 5 of the second body portion 2. The second body portion 2 is thus easily attachable to and detachable from the first body portion 1. This facilitates washing of the body portions 1, 2 after the body portions 1, 2 are stained by cutting chicken meat and bones.

(3) The movable transmission member 16 and the torsion coil spring 18 are accommodated in the recess 11, which is provided between the grip ring 12 of the handle 4 of the first body portion 1 and the pivot support portion 3. This allows compact arrangement of the movable transmission member 16 and the torsion coil spring 18 without hampering grip of the grip ring 12. The urging force of the torsion coil spring 18 is thus smoothly transmitted to the second body portion 2 through pivoting action of the movable transmission member 16.

The scissors 100 may be configured in the forms described below, for example, other than the scissors 100 of the above illustrated embodiment.

The scissors 100 of the above illustrated embodiment include the first and second body portions 1, 2, each of which has the associated handle 4, 5 and blade 6, 7, and the pivot support portion 3 for supporting the first and second body portions 1, 2 in an openable and closable manner. Also, the scissors 100 of the embodiment are in the form of western scissors, in which the first and second body portions 1, 2 cross each other in an X shape. However, the configuration of the present invention may be used in a form of V-shaped Japanese scissors, as will be described. That is, the V-shaped Japanese scissors include a pair of body portions each having a handle and a blade. Each of the handles extends from the proximal end portion, and each of the blades provided on the corresponding handle. The first and second body portions cross each other in a V shape at the proximal end portion and are supported pivotally.

The above illustrated embodiment provides an example in which the interlocking portions 19, 20 are the rows of teeth 19, 20 each configured by a spur gear such that the urging force of the torsion coil spring 18 arranged in the first body portion 1 is transmitted to the second body portion 2 through the movable transmission member 16. The reference pitch diameters of the rows of teeth 19, 20 are 30 mm for the row of teeth 19 and 24 mm for the row of teeth 20. The row of teeth 19 has a greater reference pitch diameter than the row of teeth 20. The row of teeth 19 also has a greater number of teeth than the row of teeth 20. In an alternative example, the row of teeth 20 may have a greater reference pitch diameter than the row of teeth 19 and a greater number of teeth than the row of teeth 19. In another alternative example, the rows of teeth 19, 20 may have equal reference pitch diameters and equal numbers of teeth. Further alternatively, other than the above-described rows of teeth 19, 20, gears other than spur gears or existing mechanical elements other than gears such as a belt, a link, or a cam may be employed as other forms of the interlocking portions 19, 20.

The urging member 18 may be a coil spring or an existing spring such as a leaf spring, other than the torsion coil spring 18. Such springs may be integrated with the cover portion 10 and the movable transmission member 16 of the handle 4.

The above illustrated embodiment provides an example in which the torsion coil spring 18 urges the first and second body portions 1, 2 to open. However, the torsion coil spring 18 may urge the first and second body portions 1, 2 to close.

The coupling portions 14, 15 of the above illustrated embodiment allow assembly and disassembly of the first and second body portions 1, 2 at the pivot support portion 3. The pivot support portion 3 may be modified to a form other than the illustrated form of the pivot support portion 3. For example, as disclosed in Japanese Patent No. 3010466, a structure in which a support pivot supported pivotally with respect to a guide hole is held by an engaging member may be employed as a form of the pivot support portion 3.

The above illustrated embodiment provides an example in which the urging force of the torsion coil spring 18 is transmitted to the second body portion 2 by pivoting the movable transmission member 16, which is arranged in the first body portion 1. However, the urging force of the torsion coil spring 18 may be transmitted to the second body portion 2 by sliding the movable transmission member 16.

The above illustrated embodiment provides an example in which the movable transmission member 16 and the torsion coil spring 18 are arranged in the handle 4 of the first body portion 1. However, the movable transmission member 16 and the torsion coil spring 18 may be arranged in the blade 6 of the first body portion 1.

The above illustrated embodiment provides an example in which the plastic cover portions 10 are arranged on the metallic support plates 9, which extend from the metallic blade plates 8 of the blades 6, 7 of the corresponding first and second body portions 1, 2. However, the entirety of each of the first and second body portions 1, 2 may be molded with metal or plastic.

In the scissors 100 of the above illustrated embodiment, with reference to FIG. 5, the first and second body portions 1, 2 are disassembled by, with the shapes of the pivot 14 and the pivot hole 15 aligned with each other, opening the first and second body portions 1, 2 by the maximum opening angle θ of the first and second body portions 1, 2. In this case, the urging force of the torsion coil spring 18 is transmitted in a range to an angle slightly smaller than the angle θ. As a result, upon reaching the position at the maximum opening angle, the scissors 100 switch from the state in which the urging force of the torsion coil spring 18 is transmissible to the second body portion 2 to the state in which the urging force of the torsion coil spring 18 is not transmissible to the second body portion 2. However, the scissors 100 may be configured such that the urging force of the torsion coil spring 18 is transmitted even at the maximum opening angle or an angle exceeding the maximum opening angle. Further, the angle θ may be set to 40 to 120 degrees.

A pivot restricting portion for restricting pivoting action of the first and second body portions 1, 2 in the opening direction of the first and second body portions 1, 2 may be arranged in the pivot range of the rows of teeth 19, 20. The first and second body portions 1, 2 may be disassembled from each other by aligning the shapes of the pivot 14 and the pivot hole 15 with each other at a position at which the second body portion 2 has been pivoted further from the pivot restricting portion. Further, the pivot restricting portion may be adapted to restrict pivoting action of the first and second body portions 1, 2 in a state in which the urging force of the torsion coil spring 18 is transmissible to the second body portion 2. Alternatively, the pivot restricting portion may be adapted to restrict pivoting action of the first and second body portions 1, 2 in a state in which the urging force of the torsion coil spring 18 is not transmissible to the second body portion 2. Also, the position at which the first and second body portions 1, 2 are maximally open in the pivot range of the rows of teeth 19, 20 may be set as the pivot restricting portion. The form of the pivot restricting portion may be modified to a form other than the forms presented above. For example, as a form of the pivot restricting portion, a contact projection of each blade disclosed in Japanese Examined Utility Model Publication No. 60-14440 or an engaging projection disclosed in Japanese Laid-Open Patent Publication No. 1-69472, may be employed.

The forms of the handles 4, 5 may be modified to forms other than the forms of the handles 4, 5 of the above illustrated embodiment. The handles 4, 5 may be shaped in annular or linear shapes. Further, the handles 4, 5 may be molded using shape-memory alloy or shape-memory plastic to allow a shape change of each handle 4, 5 in correspondence with the size of the hand of the user or the manner in which the handle 4, 5 is held by the user.

Fluororesin coating or diamond-like carbon (DLC) coating may be provided on the blades 6, 7 of the first and second body portions 1, 2 to facilitate cleaning or promote a smooth sliding motion on each other. Also, the distal ends of the points 6*b*, 7*b* of the blades 6, 7 may be hardened by using DLC coating or titanium nitride coating.

The scissors 100 of the above illustrated embodiment are used to cut chicken meat and bones. However, the scissors 100 of the embodiment may be employed as the scissors for cutting other objects than chicken meat and bones.

DESCRIPTION OF THE REFERENCE NUMERALS

1, 2 . . . body portions, 3 . . . pivot support portion, 4, 5 . . . handle, 6, 7 . . . blade, 11 . . . recess (accommodating portion), 11*a* . . . recess opening end, 12 . . . grip ring (grip portion), 14 . . . pivot (coupling portion) of pivot support portion, 15 . . . pivot hole (coupling portion) of pivot support portion, 16 . . . movable transmission member, 18 . . . torsion coil spring (urging member), 19, 20 . . . row of teeth (interlocking portion), scissors . . . 100

The invention claimed is:

1. Scissors comprising:

a first body portion and a second body portion each having a handle and a blade;

a pivot support portion that supports the first and second body portions in an openable and closable manner;

a movable transmission member attached to the first body portion;

an urging member arranged between the first body portion and the movable transmission member; and an interlocking mechanism adapted to transmit urging force produced by the urging member to the second body portion through the movable transmission member;

wherein the movable transmission member is attached to the handle of the first body portion, the urging member is arranged between the movable transmission member and the handle of the first body portion, the pivot support portion has a coupling portion that enables assembly and disassembly of the first and second body portions, the interlocking mechanism has a first interlocking portion and a second interlocking portion arranged in the movable transmission member and the handle of the second body portion, respectively, and the first and second interlocking portions are attachable to and detachable from each other when the first and second body portions are assembled and disassembled;

wherein an accommodating portion is arranged between the movable transmission member and the handle of the first body portion, and the urging member is received in the accommodating portion; and wherein the handle of the first body portion includes a recess serving as the accommodating portion, and the movable transmission member and the urging member are arranged inside an opening of the recess.

2. The scissors according to claim 1, wherein the handle of the first body portion has a grip portion, and the movable transmission member is provided between the grip portion and the pivot support portion.

3. The scissors according to claim 1, wherein the movable transmission member is pivotally supported by the handle of the first body portion.

4. The scissors according to claim 3, wherein a pivot axis of the movable transmission member is set at a position spaced from a pivot axis of the pivot support portion of the first and second body portions.

5. The scissors according to claim 1, wherein the first interlocking portion and the second interlocking portion are rows of teeth that are meshed with each other in a manner attachable to and detachable from each other.

6. The scissors according to claim 1, wherein, when the first and second body portions are open at a predetermined angle, the coupling portion of the pivot support portion is capable of attaching and detaching the first and second body portions along a pivot axis of the pivot support portion of the first and second body portions.

7. The scissors according to claim 6, wherein the coupling portion is configured by a pivot arranged in one of the first and second body portions and a pivot hole formed in the other one of the first and second body portions, and the pivot can be inserted into and detached from the pivot hole when the first and second body portions are assembled and disassembled.

8. The scissors according to claim 1, wherein each of the handles is arranged on a proximal side of the pivot support portion in the associated one of the body portions, and each of the blades is arranged on a distal side of the pivot support portion in the associated one of the body portions.

9. The scissors according to claim 8, wherein a lock lever is attached to one of the handle of the first body portion and the handle of the second body portion, a lock recess with which the lock lever is engaged is provided in the other one of the handle of the first body portion and the handle of the second body portion, the lock lever and the lock recess are switchable between an unlocked state, in which the lock lever is detached from the lock recess, and a locked state, in which the lock lever is engaged with the lock recess, in the unlocked state, the urging force of the urging member opens the handle of the second body portion with respect to the handle of the first body portion, in the locked state, the handle of the second body portion is prevented from being opened with respect to the handle of the first body portion against the urging force of the urging member, and cam surfaces are formed on the lock lever and the lock recess such that, when, in the locked state, the handle of the second body portion is pivoted in a closing direction with respect to the handle of the first body portion against the urging force of the urging member, the lock lever is detached from the lock recess to switch to the unlocked state.

* * * * *